United States Patent [19]

Ueda

[11] Patent Number: 5,031,026
[45] Date of Patent: * Jul. 9, 1991

[54] THIN SEMICONDUCTOR CARD

[75] Inventor: Tetsuya Ueda, Itami, Japan

[73] Assignee: Mitsubishi Denki Kabushiki Kaisha, Tokyo, Japan

[*] Notice: The portion of the term of this patent subsequent to Aug. 16, 2005 has been disclaimed.

[21] Appl. No.: 218,804

[22] Filed: Jul. 1, 1988

Related U.S. Application Data

[62] Division of Ser. No. 26,873, Mar. 17, 1987, Pat. No. 4,764,803.

[30] Foreign Application Priority Data

Mar. 17, 1986 [JP] Japan .................................. 61-60251

[51] Int. Cl.[5] ...................... H01L 23/02; H01L 23/12; H01L 39/02; H01L 23/28
[52] U.S. Cl. .......................... 357/74; 357/80; 357/72; 357/68; 235/488; 235/489; 235/492; 361/392; 361/398
[58] Field of Search ...................... 357/74, 80, 68, 72; 235/488, 489, 492; 361/392, 398

[56] References Cited

U.S. PATENT DOCUMENTS

| 4,417,413 | 11/1983 | Hoppe et al. | 235/488 |
| 4,463,971 | 8/1984 | Hoppe et al. | 235/488 |
| 4,639,585 | 1/1987 | Haghiri-Tehrani et al. | 235/492 |
| 4,746,392 | 5/1988 | Hoppe | 156/244.2 |
| 4,764,803 | 8/1988 | Ueda | 357/74 |

FOREIGN PATENT DOCUMENTS

| 0116148 | 8/1984 | European Pat. Off. . | |
| 53-6491 | 3/1978 | Japan . | |
| 55-62591 | 5/1980 | Japan . | |
| 0132519 | 5/1980 | Japan | 357/74 |
| 56-26451 | 3/1981 | Japan . | |
| 0093031 | 12/1983 | Japan | 357/74 |
| 58-210646 | 12/1983 | Japan . | |
| 61-75986 | 4/1986 | Japan . | |
| 61-86885 | 5/1986 | Japan . | |
| 2100669 | 6/1983 | United Kingdom . | |

Primary Examiner—Rolf Hille
Assistant Examiner—David Ostrowski
Attorney, Agent, or Firm—Sterne, Kessler, Goldstein & Fox

[57] ABSTRACT

The reliability of a thin semiconductor card, such as an IC card, is enhanced by stress absorbing part such as deformable part for absorbing externally applied stress, thereby preventing the stress from damaging the card main body, the semiconductor module, or the semiconductor elements. Alternatively, protection is provided by a weaker section, located away from the semiconductor module, that breaks under external stress before the stress can destroy the semiconductor module.

11 Claims, 4 Drawing Sheets

FIG. 5 (a) PRIOR ART
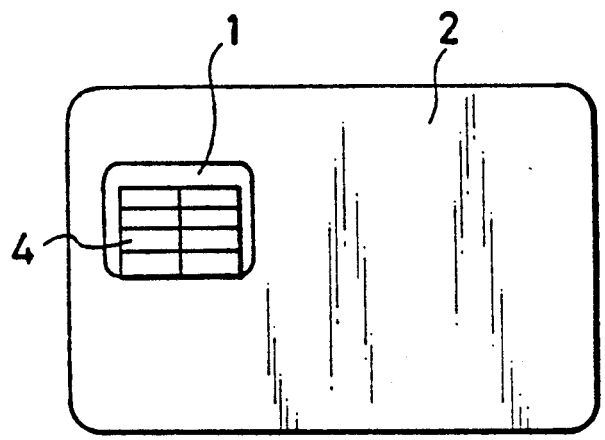
FIG. 5 (b) PRIOR ART
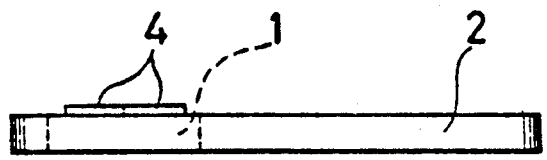

THIN SEMICONDUCTOR CARD

This application is a division, of application Ser. No. 026,873, filed Mar. 17, 1987, now U.S. Pat. No. 4,764,803.

BACKGROUND OF THE INVENTION

This invention relates to thin semiconductor cards such as IC cards incorporating semiconductor devices, and specifically to the structure of the card.

Thin semiconductor cards have a variety of configurations. The configuration discussed below is that of the most common type of IC card.

FIG. 5 shows an example of a prior art IC card, as shown for example in Japanese Patent Application Publication No. 6491/1978. The card comprises a thin semiconductor module 1 containing semiconductor elements, the card main body 2, and a set of electrode contacts 4 through which electrical transfer of information to and from an external device can take place.

An IC card of this configuration is used by inserting the card into an external device, which need only make contact with the electrode contacts 4 to exchange electrical signals with the card via the contacts.

Problems with the prior art thin semiconductor card result when the card is externally stressed, as by bending, tension, or compression. Such stresses have proved capable of breaking the semiconductor module or detaching it from the card. In some cases stresses acting on the semiconductor module have broken a semiconductor chip inside the module.

SUMMARY OF THE INVENTION

An object of the present invention is to solve these problems.

Another object of the invention is to provide thin semiconductor cards capable of protecting the thin semiconductor module and its internal semiconductor elements from destruction.

According to a first aspect of the invention, there is provided a thin semiconductor card comprising a card main body and a semiconductor module mounted therein, wherein the card main body is provided with stressabsorbing means that absorbs stresses resulting from external forces applied to the card.

According to a second aspect of the invention, there is provided a thin semiconductor card comprising a card main body and a semiconductor module mounted therein, wherein a section of the card main body at a location other that where said semiconductor module is disposed is weaker than that part of the card main body in which the semiconductor module is provided so that when external force is applied, said weaker section will break before said semiconductor module is destroyed.

According to the first aspect of the invention, externally applied stresses are absorbed by the stress absorbing means of the card, to prevent the stresses from destroying the card main body.

According to the second aspect of the invention, the semiconductor elements inside the semiconductor module are protected from destruction under external stress by a structurally weak section of the card that breaks first, the weak section being located separately from the semiconductor module.

BRIEF DESCRIPTION OF THE DRAWINGS

In the accompanying drawings:

FIG. 5(a) and 5(b) are a plan view and a side view showing a prior art thin semiconductor card.

DETAILED DESCRIPTION OF THE PREFERRED EMBODIMENTS

The preferred embodiments of the present invention are described below with reference to the drawings.

Figure 1A:
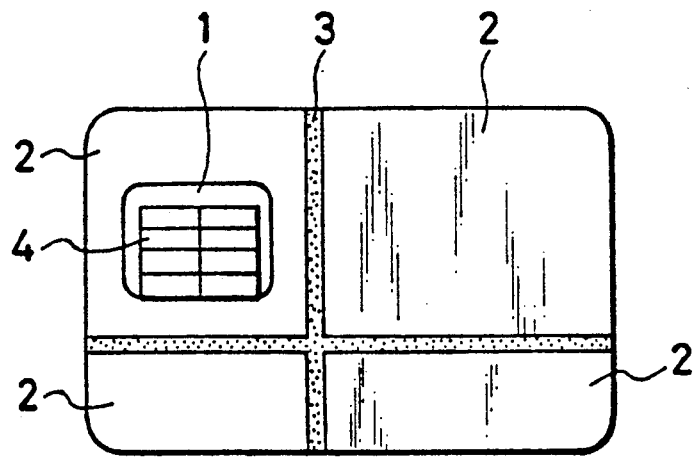
FIG. 1(a) and 1(b) are a plan view and a side view showing a thin semiconductor card of an embodiment of the invention.
Figure 1B:
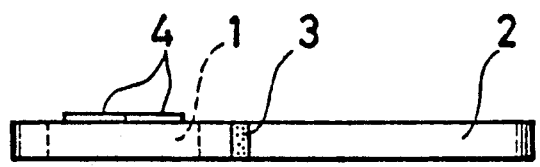

FIG. 1 shows an embodiment of the IC card which comprises a card main body 2, which may be formed, for example, of a polyvinyl-chloride plastic sandwiched between laminating materials. The IC card also comprises a semiconductor module 1 which is mounted in the card 2 and which contains a semiconductor element. The IC card further comprises deformable parts 3 extending in strips across the card main body 2 in length and width directions. The deformable parts may consist of an elastic polymer rubber. The IC card further comprises a set of electrode contacts 4 mounted on the surface of the semiconductor module.

Figure 1C:
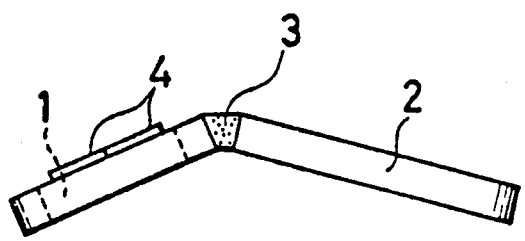
FIG. 1(c) is a side view of the card as externally stressed.

Next, the function of the IC card will be described. Normally, when the card is not acted upon by external forces, it presents a shape identical to that of a conventional IC card as, shown in the plan and side views of FIGS. 1(a) and 1(b), and can be used like a conventional IC card by insertion in an external device. If an external force such as a bending stress is applied to the card in this state, the two deformable sections 3 of the card absorb the stress by changing shape. FIG. 1(c) shows the state when an external stress has been applied.

Since external stress is absorbed by deformation of the deformable parts 3, the stress does not act on the semiconductor module 1 or the card main body 2. The module 1 and card main body 2 thereby protected from damage.

The invention is not limited to the embodiment described above, and can be applied to any thin semiconductor card. The configuration and materials of the deformable parts are not limited in either material or shape to the polymer rubber sections shown in the above embodiment. The locations of the deformable parts are not limited to the locations shown in the above embodiment, and need not divide the card into four quarters.

Figure 2A:
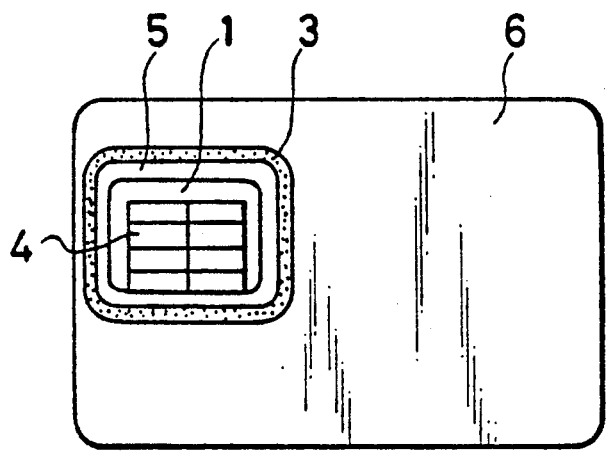
FIG. 2(a) is a plan view showing a thin semiconductor card of another embodiment of the invention.
Figure 2B:
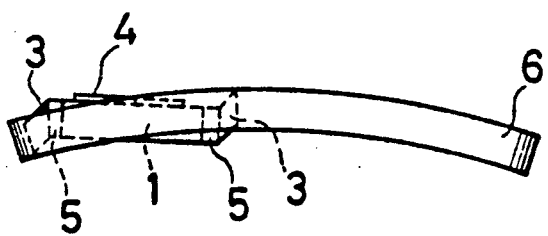
FIG. 2(b) is a side view showing the card of FIG. 2(a) as externally stressed.

FIG. 2 shows a second embodiment of the present invention in which a deformable part 3 forms a ring around the semiconductor module 1. The card main body in this embodiment consists of two sections: a small section 5 surrounding the semiconductor module 1 and a larger section 6 making up the rest of the card main body. The deformable part 3 are located between these two sections to absorb external stress, providing an effect similar to that of the first embodiment described earlier.

Although in the above embodiments the stress is described as being absorbed by deformable parts, stress may also be absorbed by a mechanical member such as a hinged coupling.

Figure 3:
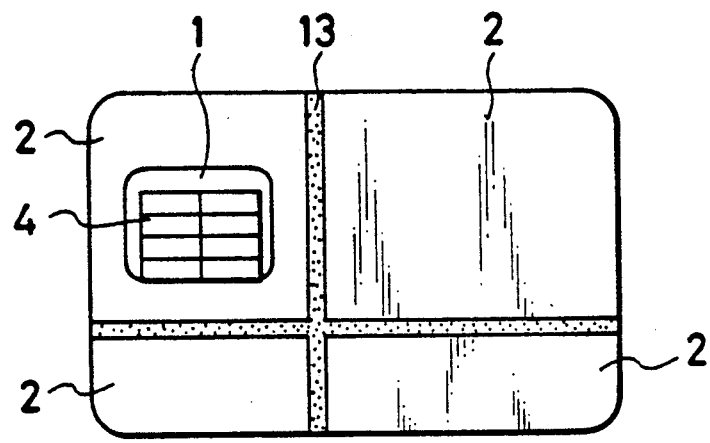
FIGS. 4 and 3 are plan views showing further embodiments of the invention.
Figure 4:
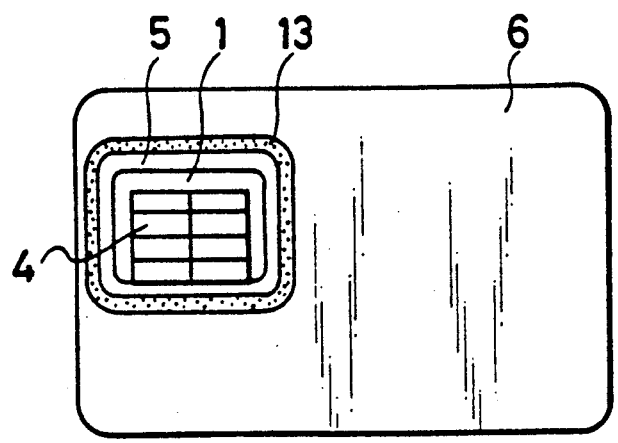

Next, further embodiments of the present invention will be described with reference to FIGS. 3 and 4. As illustrated, in place of the deformable parts 3 of the embodiments shown in FIGS. 1 and 2, corresponding portions 13 of the card main body is formed to be weaker, so that when external force is applied, the weaker portion 13 will break first. If the card is made from a polyvinyl-chloride plastic laminated on both sides, the weaker portion 13 may consist of the laminations alone (without the polyvinyl-chloride layer). Other possible materials include PMMA (polymethyl methacrylate), polyethylene, thermosetting resins (epoxy resins), and acrylic substances.

In this embodiment although the card itself breaks, the semiconductor module and its internal components (such as memory and microprocessor chips) are undamaged. Accordingly, loss of information is prevented, and the semiconductor module can be reused if mounted in another card.

In summary, the reliability of a thin semiconductor card of this invention is enhanced by a stress absorbing part such as a deformable part 3 for absorbing externally applied stress, thereby preventing the stress from damaging the card main body, the semiconductor module, or the semiconductor elements. Alternatively, protection is provided by a weaker section 13, located away from the semiconductor module, that breaks under external stress before the stress can destroy the semiconductor module.

What is claimed is:

1. A thin semiconductor card comprising:
   a card main body comprising a first section surrounded by a second section;
   a semiconductor module mounted to said first section;
   a deformable material surrounding said first section connecting said first and second sections;
   whereby said deformable material absorbs stresses resulting from external forces applied to said card.

2. A thin semiconductor card comprising:
   a card main body comprising a first section surrounded by a second section making up the rest of said card main body;
   a semiconductor module mounted to said first section;
   a material that is weaker than said first and second sections surrounding and connecting said first and second sections;
   said weaker material absorbs stresses resulting from external forces applied to said card and breaks before said first section containing said semiconductor module is stressed sufficiently to cause damage to said mounted semiconductor module.

3. A thin semiconductor card comprising:
   a card main body comprising a first section and a second section;
   a semiconductor module mounted to said first section;
   a flexible mechanical coupling connecting said first and second sections along their common boarder;
   whereby the mechanical action of said flexible mechanical coupling absorbs stresses resulting from external forces applied to said card.

4. A thin semiconductor card according to claim 1, wherein said deformable material is comprised of an elastic material.

5. A thin semiconductor card according to claim 3, wherein said flexible mechanical coupling is comprised of a hinged coupling.

6. A thin semiconductor card according to claim 1, wherein a set of electrode contacts are mounted on the surface of said semiconductor module.

7. A thin semiconductor card according to claim 2, wherein a set of electrode contacts are mounted on the surface of said semiconductor module.

8. A thin semiconductor card according to claim 3, wherein a set of electrode contacts are mounted on the surface of said semiconductor module.

9. A thin semiconductor card according to claim 1, wherein said card's overall shape is substantially identical to that of a conventional IC card.

10. A thin semiconductor card according to claim 2, wherein said card's overall shape is substantially identical to that of a conventional IC card.

11. A thin semiconductor card according to claim 3, wherein said card's overall shape is substantially identical to that of a conventional IC card.

* * * * *